US010958765B1

(12) United States Patent
Sheikh (10) Patent No.: US 10,958,765 B1
(45) Date of Patent: Mar. 23, 2021

(54) AUGMENTED REALITY FOR END-TO-END DATA CENTER IT INFRASTRUCTURE LAYOUT

(71) Applicant: Saudi Arabian Oil Company, Dhahran (SA)

(72) Inventor: Ibraheem Ahmed Sheikh, Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/573,910

(22) Filed: Sep. 17, 2019

(51) Int. Cl.
| | |
|---|---|
| *G06F 3/0484* | (2013.01) |
| *H04L 29/06* | (2006.01) |
| *G06T 19/00* | (2011.01) |
| *G06F 3/01* | (2006.01) |
| *G06T 19/20* | (2011.01) |
| *G02B 27/01* | (2006.01) |
| *G06K 9/00* | (2006.01) |

(52) U.S. Cl.
CPC ............ *H04L 67/38* (2013.01); *G02B 27/017* (2013.01); *G06F 3/011* (2013.01); *G06K 9/00671* (2013.01); *G06T 19/006* (2013.01); *G06T 19/20* (2013.01); *G02B 2027/014* (2013.01); *G02B 2027/0138* (2013.01)

(58) Field of Classification Search
CPC .. G06Q 20/3274; H04L 67/38; G02B 27/017; G06T 19/006; G06T 19/00; G06F 11/328
See application file for complete search history.

(56) References Cited

U.S. PATENT DOCUMENTS 9,122,499 B2    9/2015  Bittner et al.
9,176,728 B1 *  11/2015 Dixit ......................... G06F 8/71
                        (Continued)

FOREIGN PATENT DOCUMENTS

| WO | 2012129354 A1 | 9/2012 |
| WO | 2015101393 A1 | 7/2015 |
| WO | 2016098091 A1 | 6/2016 |

OTHER PUBLICATIONS

Haramaki, Toshiyuki et al., "A network topology visualization system based on mobile AR technology." 2015 IEEE 29th International Conference on Advanced Information Networking and Applications. IEEE, 2015.

(Continued)

*Primary Examiner* — Namitha Pillai
(74) *Attorney, Agent, or Firm* — Leason Ellis LLP (57) ABSTRACT

A method and system for presenting a data-enriched visualization of an end-to-end network topology of components in an information technology (IT) infrastructure, wherein a first asset to be deployed is selected from among a plurality of components, and the set of connections between the first asset and one or more of the plurality of components in the IT infrastructure is identified. A unique code is generated and associated with the first asset, wherein the code embodies operational data, position data, and connection data related to the first asset. Labels bearing the code are generated for application to the first asset and each identified connection of the first asset. When the code is read with a programmed device, the position data and the connection data of the first asset are visualized within the IT infrastructure on a display device using a visualization tool provided by code executing in a processor.

9 Claims, 5 Drawing Sheets

(56) References Cited

U.S. PATENT DOCUMENTS

| | | |
|---|---|---|
| 9,838,844 B2 | 12/2017 | Emeis et al. |
| 2006/0091207 A1* | 5/2006 | Chang .................. G06Q 10/087 |
| | | 235/385 |
| 2014/0351408 A1 | 11/2014 | Andersen et al. |
| 2016/0337358 A1* | 11/2016 | Tonnelier ............ G06F 16/9554 |
| 2018/0018822 A1* | 1/2018 | Zagrebin ............... G06T 19/006 |
| 2019/0172161 A1* | 6/2019 | Conboy ................ G06Q 30/018 |
| 2020/0065795 A1* | 2/2020 | Wang ................... G06Q 20/145 |

OTHER PUBLICATIONS

International Search Report and Written Opinion in Corresponding PCT Application No. PCT/US2020/050321 dated Dec. 18, 2020. 13 pages.

* cited by examiner

AUGMENTED REALITY FOR END-TO-END DATA CENTER IT INFRASTRUCTURE LAYOUT

FIELD OF THE DISCLOSURE

This patent application relates to visualization of an information technology (IT) infrastructure, and, more particularly, to the use of augmented reality (AR) technology to provide users with the end-to-end network topology associated with any given network component.

BACKGROUND OF THE DISCLOSURE

Maintenance of an information technology system and infrastructure poses many challenges, chiefly driven by the rapid development of new technologies and the attendant need to integrate these technologies into a prospective or existing IT infrastructure. When the need for a new information technology infrastructure arises, an enterprise will task responsible individuals with the job of establishing the architecture and framework of the new system. Components that provide at least the required minimum system uptime while performing all required tasks and running all applications used by the enterprise are the first assets to be deployed on a nascent network, but, inevitably, complexity becomes a defining characteristic of the enterprise network infrastructure as countless mission-critical components having different configurations and functions are integrated into the infrastructure.

Historically, labor-intensive and error-prone manual methods have been used to maintain the inventory of installed network components and the details of their routing connections to other installed network components. To illustrate, it has been common practice when deploying a new component on an IT network infrastructure to manually apply a label to the component bearing a reference number or name (and corresponding barcode) that has been selected to identify the component. Labels are also applied to network cables themselves to indicate the source and destination network ports. An Asset Management Database (AMDB) is then typically used to store identification and configuration information for each network infrastructure component, as well as routing path information for the links between components. The AMDB serves to provide a means for tracking the configuration of the subject network, and it is referenced when current network configuration information is required. However, a standard implementation of an AMDB can only provide as output an up-to-date list of network components and routing paths therebetween.

It is with respect to this background that the present disclosure is addressed.

SUMMARY OF THE DISCLOSURE

The present disclosure provides a method and system for presenting a data-enriched visualization of an end-to-end network topology of components in an information technology (IT) infrastructure.

According to a method consistent with the present disclosure, a data-enriched visualization of an end-to-end network topology of components in an IT infrastructure is provided. According to this method, a first asset is selected which is a unique component to be deployed in the IT infrastructure among a plurality of components. A set of connections is identified between the first asset and one or more of the plurality of components in the IT infrastructure.

A code generator, for instance, comprising software running on a processor, generates a unique code. The code can be associated with operational data related to the first asset, position data of the first asset within the IT infrastructure, and connection data concerning each of the identified connections of the first asset within the IT infrastructure. The code is added to an asset management database (AMDB) which is configured to store and manage infrastructure configuration data. A label bearing a machine-readable copy of the code is generated for application to a surface of the first asset and to a first end and a second end of each of the identified connections of the first asset. When the code is read with a programmed device, the system responds by presenting an augmented reality visualization of the position data of the first asset and the connection data of the first asset within the IT infrastructure on a display device using a visualization tool provided by code executing in a processor.

In certain implementations, the augmented reality presentation can further include the end-to-end network connectivity between the first asset and one or more of the plurality of components in the IT infrastructure.

In certain implementations, the code is removed from the AMDB when the associated asset is removed from the infrastructure.

In certain implementations, the code can comprise a quick response (QR) code. Such a code can be read by scanning the code with a code scanner or the camera and software executing in a smart mobile telephone or other portable electronic devices.

In a further aspect in accordance with the disclosure, an extent of the visualization provided by the visualization tool is determined by an access level associated with the reading of the code. In still a further aspect in accordance with the disclosure, the extent of the visualization of the operational data being provided to a user by the visualization tool is determined as a function of the access level associated with the reading of the code. Operational data provided as part of the visualization in one or more implementations of the present disclosure include data concerning the first asset such as asset type, asset identifier, supported communications protocols, supported applications, and asset support contacts.

In certain implementations, the code is removed from the AMDB when the associated asset is removed from the infrastructure.

In certain implementations, the code can comprise a quick response (QR) code. Such a code can be read by scanning the code with a code scanner or the camera and software executing in a smart mobile telephone or other portable electronic devices.

The present disclosure also provides a system based upon an information technology (IT) infrastructure of the type including a first asset comprising a unique component to be deployed in the IT infrastructure among a plurality of components having a plurality of connections between them, and an asset management database (AMDB) configured to store and manage infrastructure configuration data. The system further comprises a software-based code generator which generates and associates a unique code with each of the plurality of components. Each code that is generated can include operational data related to the component, position data of the component within the IT infrastructure, as well as connection data concerning each of the connections of the component within the IT infrastructure, as identified in the AMDB. The system can incorporate labels that are to be applied to the surface of each component and to a first end and a second end of each of its identified connections. The label bears a machine-readable copy of the code associated with the component. In accordance with a salient aspect of the present disclosure, the system further comprises a visualization tool, which is enabled by code executing in a processor. The visualization tool responds to a reading of the generated code with a display of an augmented reality presentation that includes the position data of the first asset and the connection data of the first asset within the IT infrastructure.

In one implementation consistent with the present disclosure, the system also includes a controller coupled to the visualization tool. The controller is responsive to an access level associated with a device that is being used to read the generated code by providing visualization of the operational data of the first asset. The operational data includes, without limitation: asset type, asset identifier, supported communications protocols, supported applications, and asset support contacts.

In a further aspect that may be included in one or more implementations of the system, the extent of the visualization of operational data provided by the visualization tool is determined by the access level associated with the device used to read the generated code.

These and other features, aspects, and advantages can be appreciated from the following description of certain embodiments in accordance with the present disclosure.

BRIEF DESCRIPTION OF THE DRAWINGS

The accompanying drawing figures illustrate exemplary embodiments and are not intended to be limiting of the present disclosure. Among the drawing figures, like references are intended to refer to like or corresponding parts.

DETAILED DESCRIPTION OF CERTAIN EMBODIMENTS ACCORDING TO THE DISCLOSURE

The present disclosure concerns a method and system that can be used to present a rich visualization of an information technology (IT) system to a user with the appropriate privileges, enabling the user to expedite the pinpointing and troubleshooting of network components experiencing technical problems as well as aiding the addition of new components to the network.

Information technology networks are by nature complex creations. They grow with the enterprise they serve and become more complex in that process. The present disclosure provides a method and system in which the successive addition of each component to an enterprise IT network results in a capture of a body of relevant information about the component for later, on-demand retrieval by IT specialists and others who have the need—and the authorization—to access the component information. A specialist can scan a unique code that has been created to encapsulate the captured component information and then he or she can be presented with information about the component that is needed to both locate and then troubleshoot the component.

Figure 1:
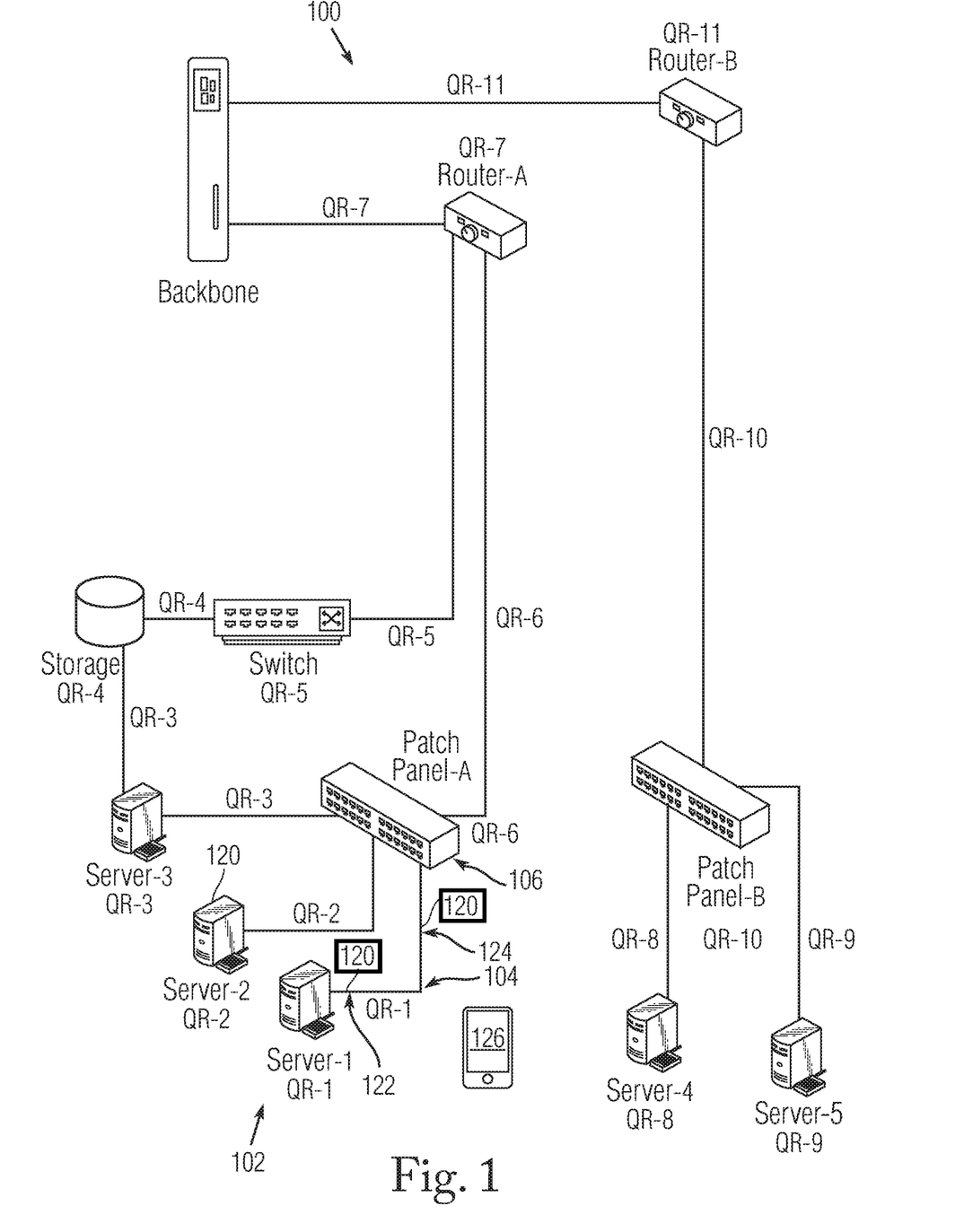
FIG. 1 illustrates a schematic view of an exemplary information technology (IT) infrastructure that can be visualized by a system implementing the present disclosure.

FIG. 1 shows an exemplary information technology (IT) network infrastructure 100 that can benefit from the technological solution of the present disclosure. As shown, the network 100 is comprised of a variety of components such as servers, switches, patch panels, storage devices, routers, and a backbone that connects the disparate components of the network. None of these components are part of the present solution, but their arrangement is what the present solution is configured to manage.

An IT network infrastructure must be carefully planned, but this planning must not be done with only for the eventual, fully-realized network in mind. The needs of the network and its users must be considered at every stage of a nascent network's buildout, from its inception when it is tasked with providing essential computing services to users in perhaps one business unit of a company, or even just one working group within a business unit, to the point when the envisioned full-scale network has gone live, linking all business units of a company that can be spread across continents.

In one implementation consistent with the present disclosure, starting from the inaugural component of the network, and for each component that is added thereafter, a unique code is generated that is associated with that component for the rest of its service life in the network. One type of code that is ideally suited for use as the code in the invention is the Quick Response (QR) code that was developed for the Japanese automotive industry in the 1990s. A QR code is a two-dimensional matrix barcode that has a maximum character storage capacity of 7,089 for purely numeric characters and 4,296 for alphanumeric characters. The high information capacity of the QR code makes it ideal for the captured component information of the present disclosure, as described further below. The QR codes that have been generated for each component of the exemplary IT network infrastructure are shown symbolically in the Figures as QR-1, QR-2, etc.

In another implementation which is also consistent with the present disclosure, as components are added to an existing network, or as components are serviced or otherwise accessed, unique codes can be generated, such as QR codes, and can be associated with the added, serviced, or accessed component in the same way as described further below for a network being inaugurated.

Figure 2:
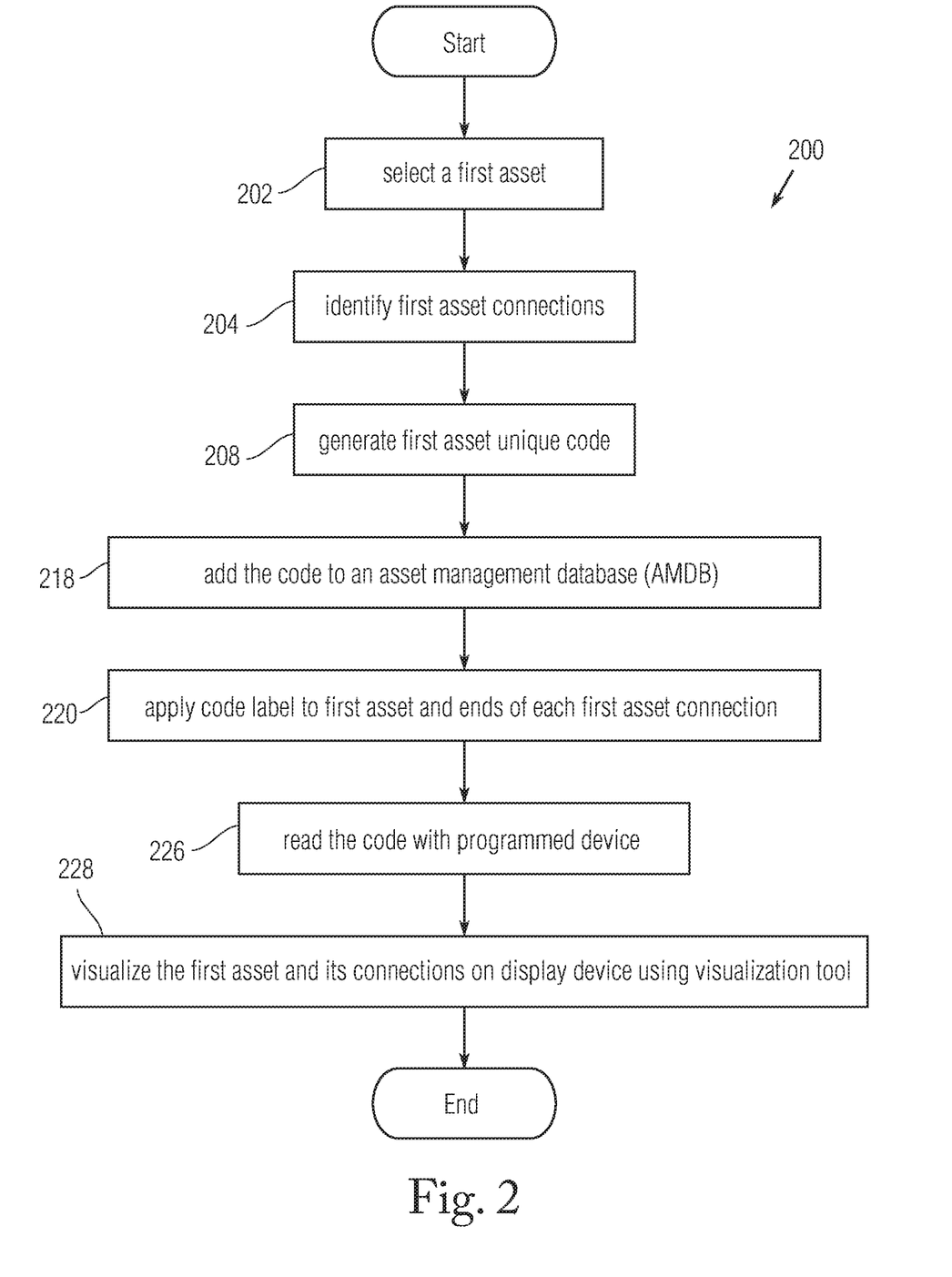
FIG. 2 illustrates a schematic view of the steps of a method described in the present disclosure for presenting a data-enriched visualization of an end-to-end network topology of components in an information technology (IT) infrastructure.

The method of the present invention is now described with reference to FIGS. 1 and 2. FIG. 1 illustrates an exemplary information technology (IT) network infrastructure 100 to which the disclosed method can be applied, and FIG. 2 is a schematic illustration of one method 200. With the network design established in a manner consistent with information technology best practices and the needs of the specific enterprise, the network is now ready to be built out according to procedures that will maintain the highest possible system uptime for services that have been enabled, while also providing the interfaces that allow further expansion of the network. IT network infrastructures for each of the individual business units of the company can be built independently of one another, and as each infrastructure becomes ready it can be linked via an internet backbone to the completed network infrastructures of other business units. Therefore, it is appropriate to begin the description of the disclosed method by first considering the IT network infrastructure build-out at one business unit of an enterprise, which will then be generally applicable to network infrastructure build-outs at all other business units of the enterprise. The design specifies certain foundational or core components that must be in place and functioning to provide essential computing services before the addition of other components. The range of infrastructure components that make up an IT network infrastructure include, without limitation, hardware such as network servers, storage media, network hubs, as well as various network switches, modems, routers, bridges, and repeaters to implement connections between the various components. From this list of possible components, it is likely that a network server will be a component that needs to be in place first to service a core group of users, as it hosts a multitude of programs that provide both basic, enabling functionality as well as advanced application support.

According to the disclosed method, the selection of the first component or first asset 102, which in the illustrated example is a network server "Server-1," is the first step 202 in method 200. While multiple units of this specific server model may be used in the network infrastructure, this component, the first asset 102, is a unique component to be deployed in the IT infrastructure 100 among the plurality of components that will ultimately be used.

The next step 204 in the network build-out process for the business unit under consideration is identifying a set of connections 104 between the first asset 102, in this example Server-1, and one or more of the plurality of components 106 in the IT network infrastructure. This plurality of components are the additional assets that will comprise the infrastructure 100 after all planned connections are made according to the design.

Server-1 connects to a component 106, which in the illustrated example comprises a patch panel, namely, "Patch Panel A." A patch panel is a component that incorporates multiple jacks and provides connecting and routing functionality between other components 106 of the network 100. The Server-1 can be connected to other components, and this is merely for use in describing an arrangement that benefits from the technological solution of the present disclosure.

Figure 1A:
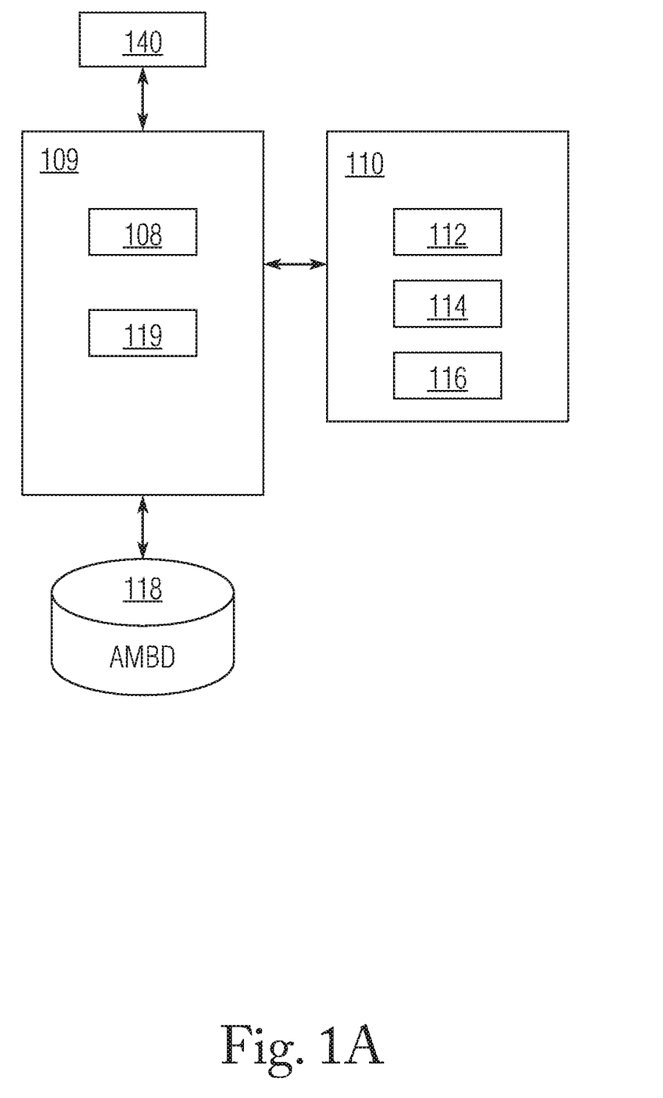
FIG. 1A illustrates a block diagram of a structural arrangement suitable for implementing a visualization system according to the present disclosure.

Referring now to FIGS. 1 and A1, with the first asset 102 and its connections to other components 106 having been identified, the next step 208 utilizes code generator software 108 executing in a processor 109 which configures the processor 109 to generate a unique code 110, stored in a memory 111. The code is thereafter associated with the first asset 102 and also with the first asset's connections 104. In the illustrated example, the connection is between Server-1 and Patch Panel A. In an embodiment of the invention, the code 110 is a Quick Response (QR) code referred to earlier, and this type of code lends itself to use in the invention due to its high information capacity as well as the ubiquity of QR code scanners, which are standard equipment in many, if not most, smartphones manufactured today. FIG. 1 shows the embodiment using QR codes, so the generated code 110 that is associated with Server-1 and its connection to Patch Panel A is shown symbolically in the figure as QR-1.

More particularly, the code 110 that is generated by the code generator software 108 for association with the first asset 102 incorporates data about the first asset that can include, but is not limited to, operational data 112 related to the first asset, position data 114 of the first asset within the IT infrastructure 100, and connection data 116 concerning each of the identified connections 104 of the first asset 102 within the IT infrastructure 100. This data is stored in a non-transient memory 111 which is accessible to the code generator software 108. The operational data related to the first asset includes, without limitation: asset type, asset identifier, supported communications protocols, supported applications, and asset support contacts. The position data of the first asset includes, without limitation, the relative position of the first asset with respect to the other components within the IT infrastructure, as well as geographical position data related to the first asset. All of this information is used for visualization on a display and of a given asset, its operational data, its location and its connections within the network, all in response to reading the code 110.

Once the first asset's code 110 has been generated by the code generator software 108, the next step 218 of method 200 is adding the code 110 to an asset management database (AMDB) 118, in response to operation of a controller 119, wherein the AMDB 118 is configured to store and manage infrastructure configuration data pertaining to the IT infrastructure. The AMDB 118 maintains a dynamically-updatable inventory of all routing paths between components of the IT infrastructure that have been catalogued therein, effectively establishing and maintaining the links between all components of the IT infrastructure, and with the installation of each new component or retirement of existing components, the AMDB's inventory of routing paths comprising the infrastructure is revised. The controller 119 coordinates changes to the AMDB 118, including the addition of new codes and the deprecation of old codes as assets reach the end of their respective service life or usefulness. The controller can share the processor 109 used by the code generator or can be supported by or comprise an independent hardware device.

The code 110 generated and associated with each component of the IT infrastructure is maintained in the AMDB 118 for the entire service life of the component. In like manner, the method of the present disclosure removes the code from the AMDB 118 when the associated asset and any associated extra connections are removed from the infrastructure. A variety of possible solutions for an AMDB are possible, including commercial off-the-shelf solutions such as Network Engineer and comparable products. It is understood that the same process just described is repeated for each of the remaining components in the IT network infrastructure, treating each new component in turn as the first asset and identifying its connections to subsequent components.

Cataloging of the first asset 102 and its code 110 in the AMDB is followed by step 220 of method 200, which attends to the marking of the actual hardware that has been associated with the generated code 110. This is done by generating a label 120 bearing a machine-readable copy of the code 110. This label is thereafter manually applied to a surface of the first asset 102 and to a first end 122 and a second end 124 of each of the identified connections 104 of the first asset 102.

Step 226 of method 200 comprises using a programmed device 126 capable of scanning a code 110 such as a QR code to read the code on the label of the first asset 102 or any of its connections 104, which prompts the system in step 228 to respond by generating an augmented reality (AR) presentation. For instance, the programmed device 126 can be a smart phone or other personal digital device with a processor, memory and a display.

Figure 3:
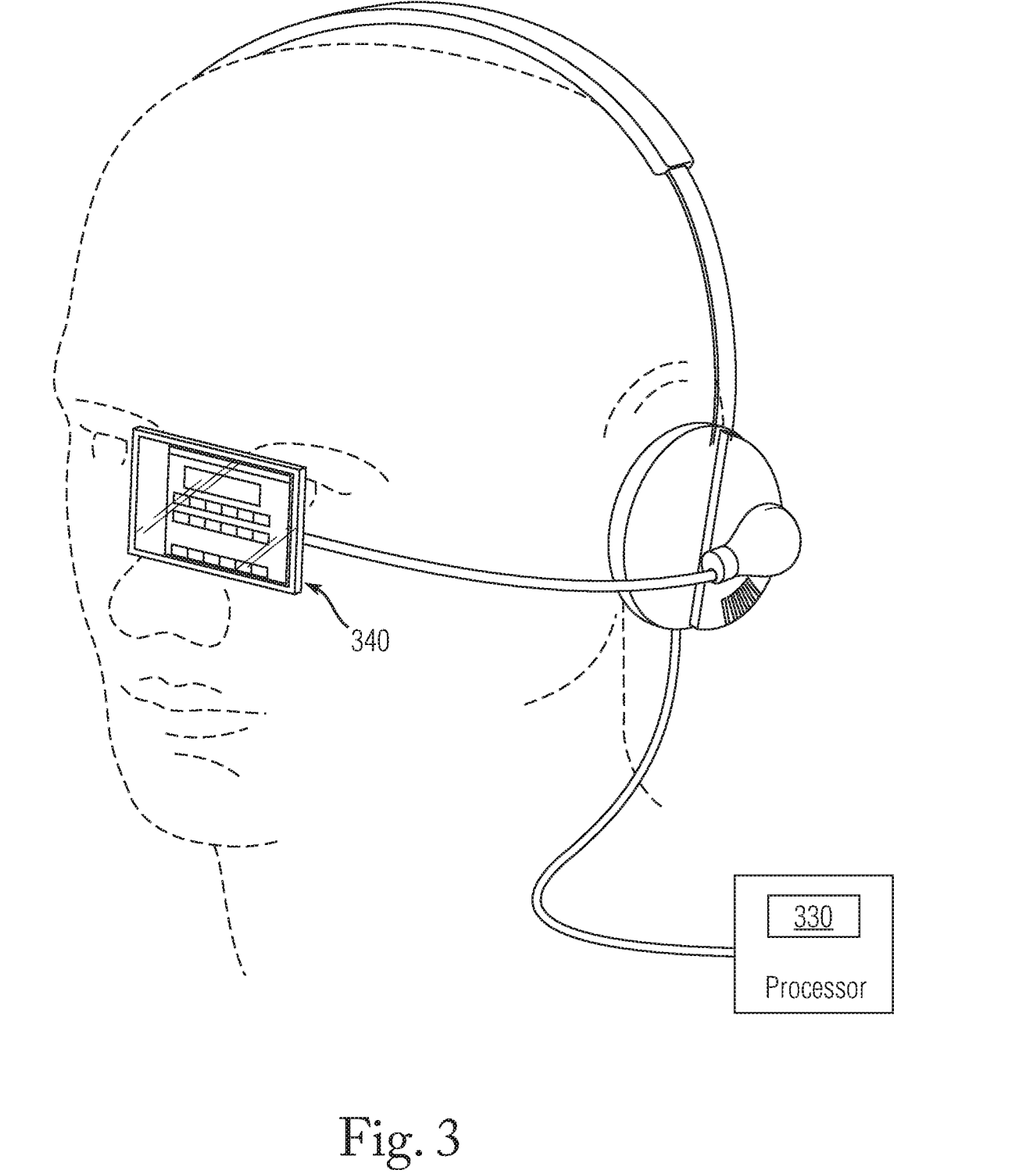
FIG. 3 illustrates an embodiment of an augmented reality display device that can be used by a system implementing the present disclosure, though the disclosure can be used with a display device that mounts on a wall, in a rack, or sits atop a desk or other surface.

The AR presentation can include the first asset 102, the position data of the first asset, and the connection data of the first asset within the IT infrastructure 100. These data can be visualized on a display device 340 (or monitor 140 in FIG. 1, or on both) using a visualization tool 330 provided by code executing in a processor of a particular electronic device, including, in some implementations, the smart phone 126, and in other implementations using a head-mountable display device 340, as shown in FIG. 3.

Figure 4:
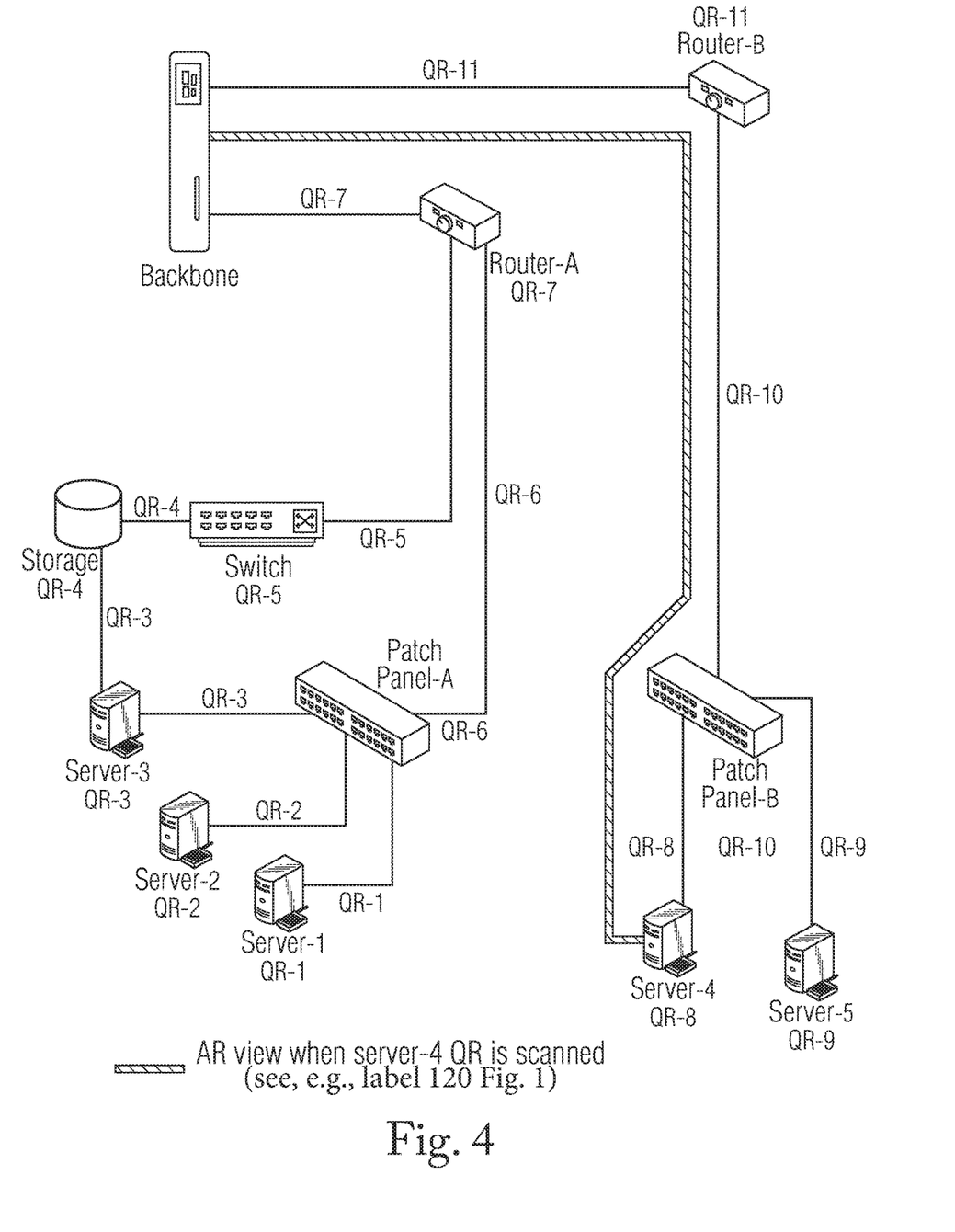
FIG. 4 illustrates a schematic view of an augmented-reality presentation of the exemplary IT network that is presented after a QR code associated with a component of the network has been scanned by a smart device that has a QR code scanner.

The user can select a specific display presentation, including a presentation of the complete end-to-end network connectivity between the first asset 102 and one or more of the plurality of components 106 in the IT infrastructure, as shown FIG. 4 when the code associated with Server-4 has been scanned. In detail, FIG. 4 shows one possible visualization provided by a system implementing the method if the present disclosure. In this example, a user has scanned the QR code label affixed to Server-4, and the display device 328 presents a visualization of the network infrastructure wherein the end-to-end connection from Server-4 to the backbone is highlighted for the user. Alternatively, the user can be shown a subset of the network, such as the direct connections between the scanned device/code and its next component connection. Still, alternatively, the user can be shown direct and further connections in response to scanning the code.

In accordance with a salient aspect of the present disclosure, the extent of the visualization data provided to the user by the visualization tool 130 is a function of an access level associated with the logged-in or otherwise identified user of the device that was used to read the code 110. For example, if the user scanning Server-1 is a member of the Vendor Support Staff, he or she can be presented with a minimum view which, in an embodiment, shows operational data constrained to details such as: server name, serial number, datacenter/building, rack location, server manufacturer, model, warranty start and end dates, and server (hardware) owner and contact details. On the other hand, if the user is part of the Datacenter Monitoring Staff and possesses higher system privileges, he or she can be presented with additional details as part of the visualization of operational data, such as server application name, application owner and contact details, and status information about any ongoing change or incident tickets such as ticket number, duration, incident details, and coordinator contact. Finally, a user with the highest system privileges, such as an IT Support Analyst, can be presented with still further operational data pertaining to network connectivity, such as connectivity type (i.e., fiber), number of connections, source and destination information, as well as network device details such as the number and types of devices (e.g., routers, modems, and backbones), rack locations, device names, device serial numbers and ports.

The controller 119 can be used to determine the access level for a given user who has scanned the code 110 and establish the extent of the operational data that can be visualized by the user.

The scope and content of the operational data available to be visualized exceeds the amount of information that can be readily printed and maintained on a tag affixed to a component or its cables, and such tags cannot discriminate in what they reveal to a user. The present disclosure addresses and resolves this technical problem in the art by employing codes as described above so as to identify assets and their respective connections.

The invention encompassed by the present disclosure has been described with reference to the accompanying drawings, which form a part hereof, and which show, by way of illustration, example implementations and/or embodiments. As such, the figures and examples above are not meant to limit the scope of the present application to a single implementation, as other implementations are possible by way of interchange of some or all of the described or illustrated elements, without departing from the spirit of the present disclosure. Among other things, for example, the disclosed subject matter can be embodied as methods, devices, components, or systems.

Moreover, where certain elements of the present application can be partially or fully implemented using known components, only those portions of such known components that are necessary for an understanding of the present application are described, and detailed descriptions of other portions of such known components are omitted so as not to obscure the application. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present application encompasses present and future known equivalents to the known components referred to herein by way of illustration.

Furthermore, it is recognized that terms used herein can have nuanced meanings that are suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter can be based upon combinations of individual example embodiments, or combinations of parts of individual example embodiments.

The foregoing description of the specific implementations will so fully reveal the general nature of the application that others can, by applying knowledge within the skill of the relevant art(s) (including the contents of the documents cited and incorporated by reference herein), readily modify and/or adapt for various applications such specific implementations, without undue experimentation, without departing from the general concept of the present application. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). It is to be understood that dimensions discussed or shown of drawings are shown accordingly to one example and other dimensions can be used without departing from the present disclosure.

While various implementations of the present application have been described above, it should be understood that they have been presented by way of example, and not limitation. It would be apparent to one skilled in the relevant art(s) that various changes in form and detail could be made therein without departing from the spirit and scope of the disclosure. Thus, the present disclosure should not be limited by any of the above-described example implementations, and the invention is to be understood as being defined by the recitations in the claims which follow and structural and functional equivalents of the features and steps in those recitations.

What is claimed:

1. A method for presenting a data-enriched visualization of an end-to-end network topology of components in an information technology (IT) infrastructure, the method comprising:
    selecting a first asset, the first asset being a unique component to be deployed in the IT infrastructure among a plurality of components;
    identifying a set of connections between the first asset and one or more of the plurality of components in the IT infrastructure;
    generating a unique code, wherein the code is associated with data selected from the group consisting of: (i) operational data related to the first asset, (ii) position data of the first asset within the IT infrastructure, and (iii) connection data concerning each of the identified connections of the first asset within the IT infrastructure;
    adding the code to an asset management database (AMDB) which is configured to store and manage infrastructure configuration data;
    generating a label bearing a machine-readable copy of the code;
    applying the generated label to a surface of the first asset and to a first end and a second end of each of the identified connections of the first asset;
    reading the code with a programmed device; and
    in response to reading the code, and within an augmented reality presentation, visualizing the position data of the first asset and the connection data of the first asset within the IT infrastructure on a display device using a visualization tool provided by code executing in a processor:
    visualizing the operational data of the first asset, wherein the operational data comprises: asset type, asset identifier, supported communications protocols, supported applications, and asset support contacts; and
    an extent of the visualization provided by the visualization tool is determined by an access level associated with a device that is used to read the generated code, and wherein the operational data provided by the visualization tool is a function of the access level.

2. The method as in claim 1, wherein an extent of the visualization provided by the visualization tool is determined by an access level associated with the reading of the code.

3. The method as in claim 1, wherein the code is a quick response (QR) code and wherein the step of reading the code comprises scanning the QR code with a code scanner.

4. The method as in claim 3, wherein the scanning comprises scanning the code using a smart device having the code scanner.

5. The method as in claim 4, wherein an extent of the visualization provided by the visualization tool is determined by the access level associated with the device used to read the generated code, and wherein the operational data provided by the visualization tool is a function of the access level.

6. The method as in claim 1, wherein the position data is geographical position data.

7. The method as in claim 1, wherein the augmented reality presentation of the IT infrastructure presents end-to-end network connectivity between the first asset and one or more of the plurality of components in the IT infrastructure.

8. The method as in claim 1, further comprising removing the code from the AMDB when the associated asset is removed from the infrastructure.

9. A system for presenting a data-enriched visualization of an end-to-end network topology of components in an information technology (IT) infrastructure, the system comprising:
    an information technology (IT) infrastructure comprising:
        a first asset, the first asset being a unique component to be deployed in the IT infrastructure among a plurality of components;
        a plurality of identified connections between components, wherein each identified connection includes a first end and a second end; and
        an asset management database (AMDB) which is configured to store and manage infrastructure configuration data;
    a code generator, comprising software configured to generate and associate a unique code with each of the plurality of components, wherein each code generated is associated with data selected from the group consisting of: (i) operational data related to the component, (ii) position data of the component within the IT infrastructure, and (iii) connection data concerning each of the connections of the component within the IT infrastructure, as identified in the AMDB;
    a plurality of labels, each label applied to the surface of a component and to the first end and the second end of each of its identified connections and bearing a machine-readable copy of the code associated with the component;
    a visualization tool comprising code executing in a processor, wherein the visualization tool responds to a reading of the generated code with a display of an augmented reality presentation which includes the position data of the first asset and the connection data of the first asset within the IT infrastructure; and
    a controller coupled to the visualization tool and responsive to an access level associated with a device that is used to read the generated code by visualizing the operational data of the first asset, wherein the operational data comprises: asset type, asset identifier, supported communications protocols, supported applications, and asset support contacts.

* * * * *